United States Patent [19]
Gibson et al.

[11] Patent Number: 5,227,579
[45] Date of Patent: Jul. 13, 1993

[54] MANIFOLD SEPARATION DEVICE

[75] Inventors: David A. Gibson, Fayetteville, Tenn.; Charles S. Cornelius, Huntsville, Ala.

[73] Assignee: The United States of America as represented by the Secretary of the Army

[21] Appl. No.: 896,631

[22] Filed: Jun. 10, 1992

[51] Int. Cl.⁵ .............................................. B64G 1/40
[52] U.S. Cl. ..................................... 102/378; 244/172
[58] Field of Search ...................... 244/172, 58, 137.4; 102/377, 378, 393; 89/1.14, 1.57

[56] References Cited

U.S. PATENT DOCUMENTS

| | | | |
|---|---|---|---|
| 3,513,512 | 5/1970 | Phillips | 102/377 |
| 4,834,324 | 5/1989 | Criswell | 244/172 |
| 4,964,340 | 10/1990 | Daniels et al. | 244/172 |
| 5,107,767 | 4/1992 | Schneider et al. | 102/393 |
| 5,117,758 | 6/1992 | Renzi | 89/1.14 |
| 5,131,610 | 7/1992 | Demange | 244/172 |

Primary Examiner—David H. Brown
Attorney, Agent, or Firm—Freddie M. Bush; Hay Kyung Chang

[57] ABSTRACT

The booster motors, each attached to and surrounding a centerbody, are mutually connected to each other via one or more hollow manifold legs through which propulsive gases flow freely. At a predetermined time, the manifold cutter receives a signal activating the cutter to sever the manifold leg. Upon severance, the cut manifold leg still attached to the booster acts as a nozzle by venting residual propulsive gases and thereby propelling the booster away from the centerbody.

5 Claims, 6 Drawing Sheets

MANIFOLD SEPARATION DEVICE

DEDICATORY CLAUSE

The invention described herein may be manufactured, used, and licensed by or for the Government for governmental purposes without the payment to us of any royalties thereon.

BACKGROUND OF THE INVENTION

At present, all anti-armor missile systems carry the propulsion units (boost and flight motors) internally, i.e., inside the missile fuselage. When these motors have "burned out", i.e. provided all of their propulsive energy to the missile for acceleration downrange, they become parasitic weight and make no other contribution to the flight of the missile. Externally mounted propulsion units (boosters) which can be jettisoned after the transfer of their energy to the missile allow the remaining missile components to be packaged in a smaller, separate volume, thereby reducing the frontal area of the missile. Upon release of the boosters in a kinetic energy missile application, the drag on the missile that had been caused by the externally mounted boosters is eliminated. This enables the low-drag centerbody of the missile to maintain a high velocity for a much longer period of time than it would otherwise and thereby increase drastically its effectiveness.

SUMMARY OF THE INVENTION

Manifold separation device allows the boosters to be attached externally to the missile's fuselage from which, after they have accelerated the missile to its maximum attainable speed, they can be detached and discarded. The detachment and discard of the boosters is accomplished by severing the manifold legs connecting the boosters with each other, around the centerbody (i.e. the missile) and thereby causing the boosters to be jettisoned away from the centerbody under the propulsion of the gases being vented from the cut manifold legs.

DESCRIPTION OF THE PREFERRED EMBODIMENT

Figure 1:
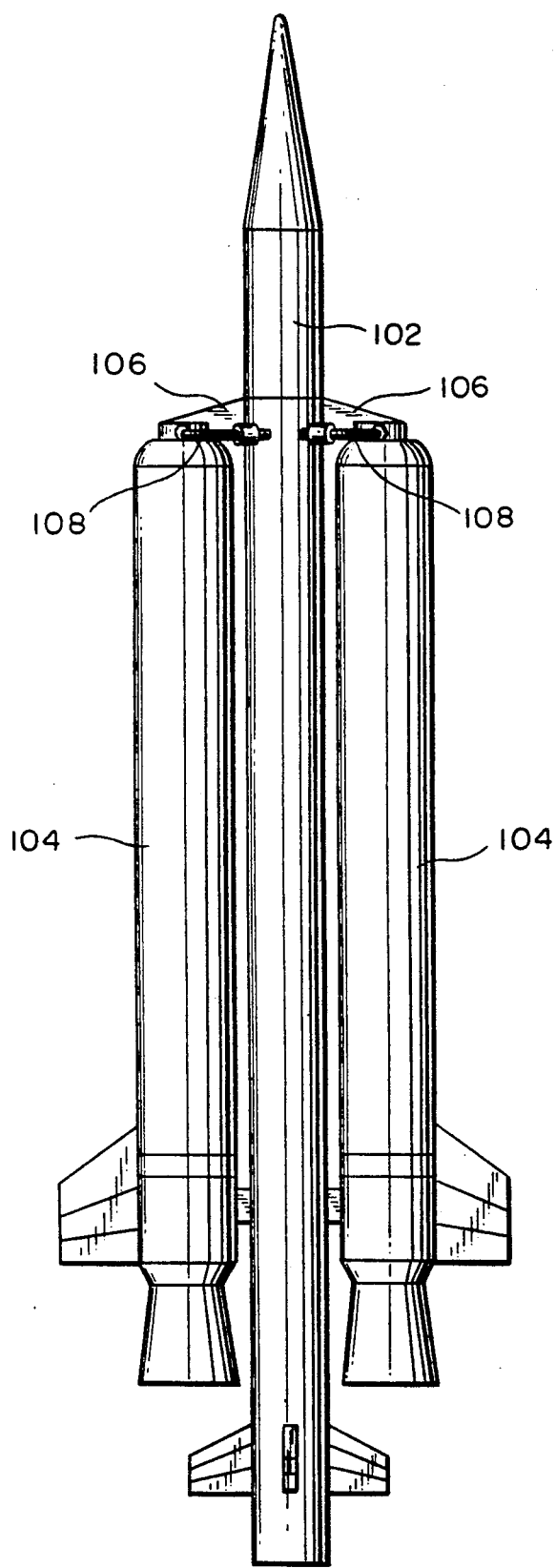
FIG. 1 depicts a side view of the centerbody assembled with the boosters.

Turning now to the Figures wherein like numbers refer to like parts, FIG. 1 depicts a side view of the centerbody 102 assembled with boosters 104. Prior to the activation of the manifold separation device, boosters 104 are coupled to each other by manifold legs 108 and to centerbody 102 via motor thrust transfer struts 106.

Figure 2:
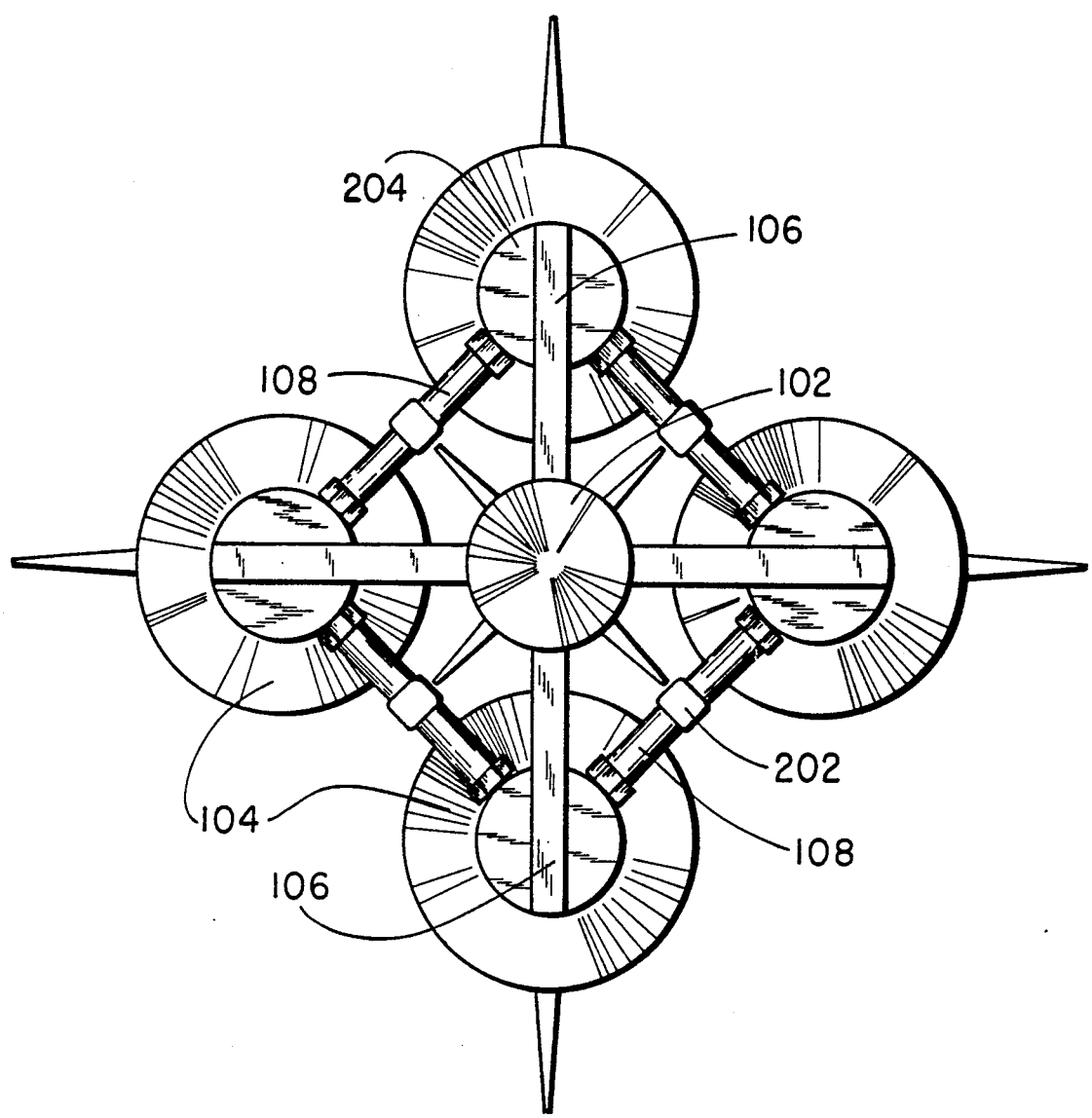
FIG. 2 is a frontal view of the centerbody assembled with the boosters.
Figure 3:
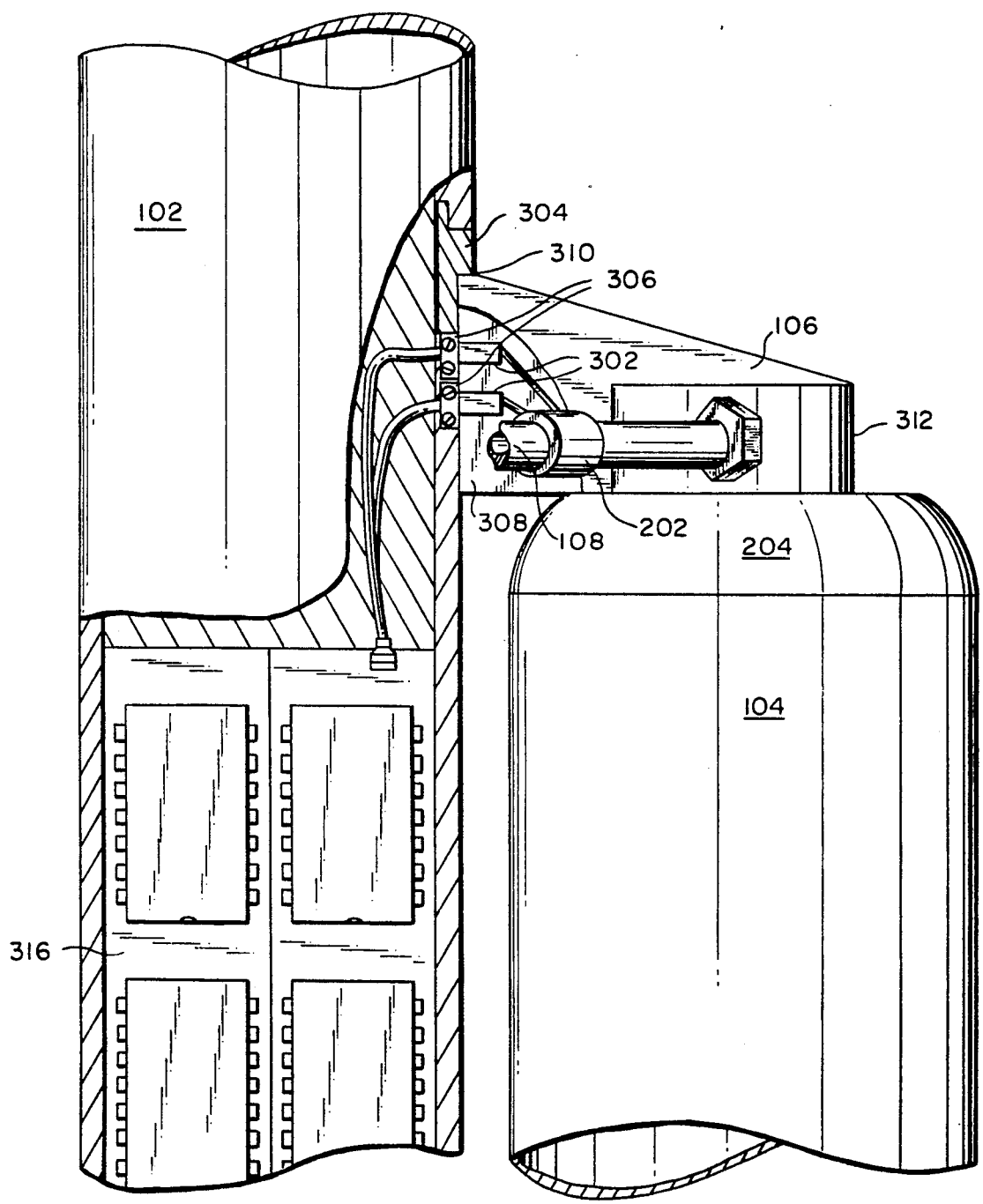
FIG. 3 is a cut-away view of a diagram of a preferred embodiment.

A frontal view of the assembled centerbody and boosters is presented in FIG. 2. A hollow manifold leg 108 whose hollowness is shown in greater detail in FIG. 3, is positioned between two adjacent boosters 104 and connects them so that a closed ring is formed around centerbody 102 by the boosters and the manifold legs alternating with each other. Such a connection allows the propulsive gases to flow through the complete ring, minimizing the pressure differences between the booster motors. This, in turn, minimizes the perturbation to the centerbody's flight path upon the release and discarding of the boosters from the centerbody while in flight, when manifold cutters 202, one of which is mounted appropriately to sever each manifold leg 108 at a predetermined time, severs each respective manifold leg.

A cut-away enlarged view of a representative manifold leg 108, strut 106 and their associated structures is given in FIG. 3. Centerbody 102 has, affixed to its surface, a raised step 304 which, in conjunction with the surface, creates a niche 310 into which one end of strut 106 abuts, to slide off from the niche subsequently. The other end 312 of the strut is permanently attached to forward head closure 204 of booster 104. The strut may be structured so that it has a cavity 308 therethrough. The thrust of the booster 104 is transferred to centerbody 102 by strut 106 via step 304. Further, forward head closure 204 is designed to allow manifold assembly, that is comprised of a plurality of manifold legs 108 to connect each of the boosters to adjacent boosters around the centerbody thereby allowing free flow of propulsive gases through the boosters and the manifold legs. Such an arrangement equalizes operating pressure differences between the booster motors.

Figure 4:
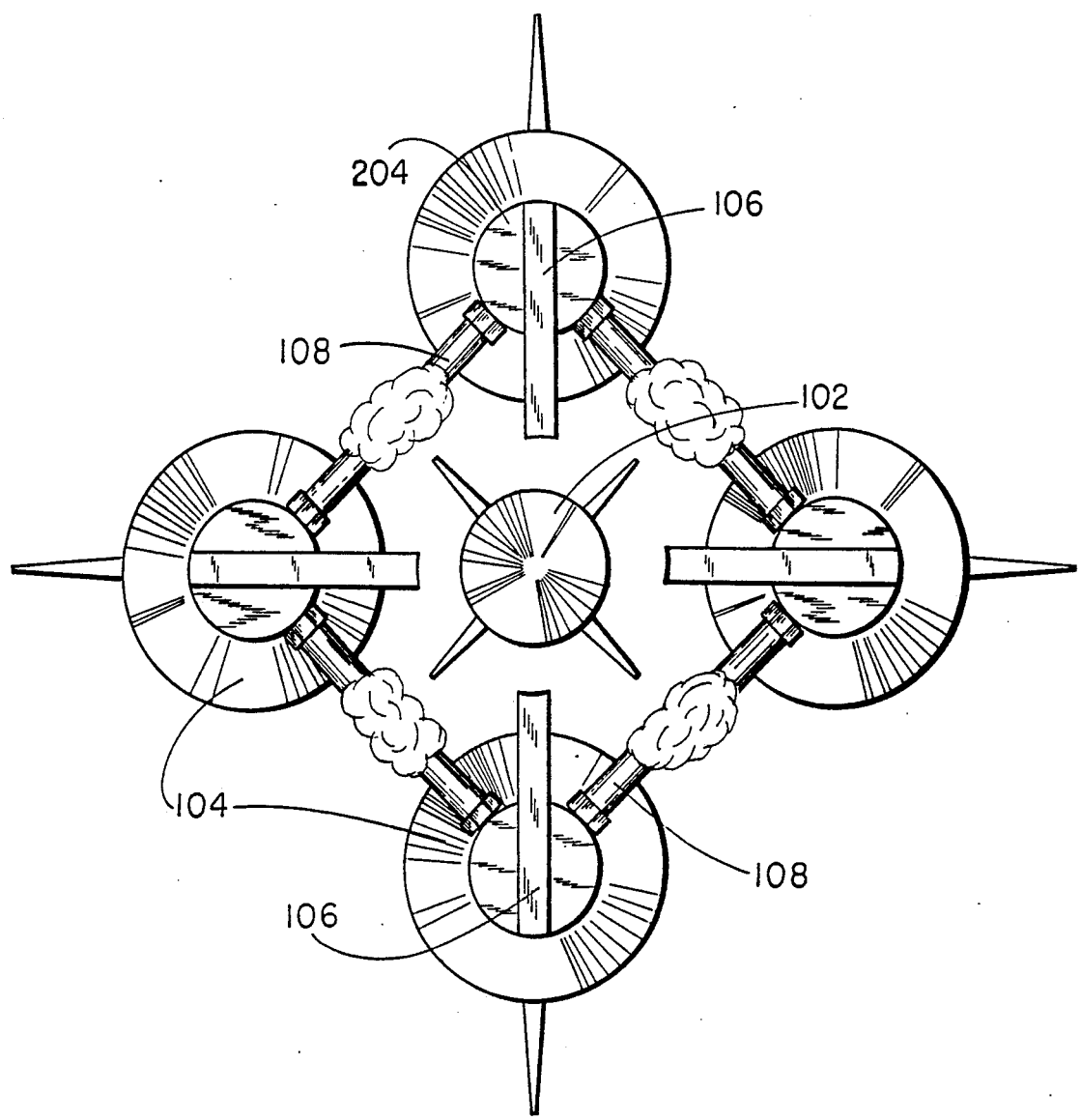
FIG. 4 depicts the simultaneous severance of the manifold legs.

A linear-shaped charge explosive cutter 202 is situated at about the midpoint of manifold leg 108 and severs the leg upon receipt of a signal from contacts 302 to which it is coupled. The signal originates at the timing circuit 316 located in the guidance and control computer, not shown, in centerbody 102. From the timing circuit, the signal travels via conventional electrical connecting means to buses 306 which are embedded into surface of centerbody 102 and into which contacts 302 are removably plugged. The contacts are spring-loaded to insure good enabling connection between the bus and cutter 202 through connecting wires and can be housed in cavity 308 of the strut as shown in FIG. 3. The signal is generated so that it is input to activate cutter 202 to cut manifold leg 108 into two parts at a predetermined time which coincides with the centerbody's maximum attainable velocity. All the manifold legs connecting the boosters in the closed ring around the centerbody are severed simultaneously in the same manner as described above. The severance is visually depicted in FIG. 4.

Figure 5:
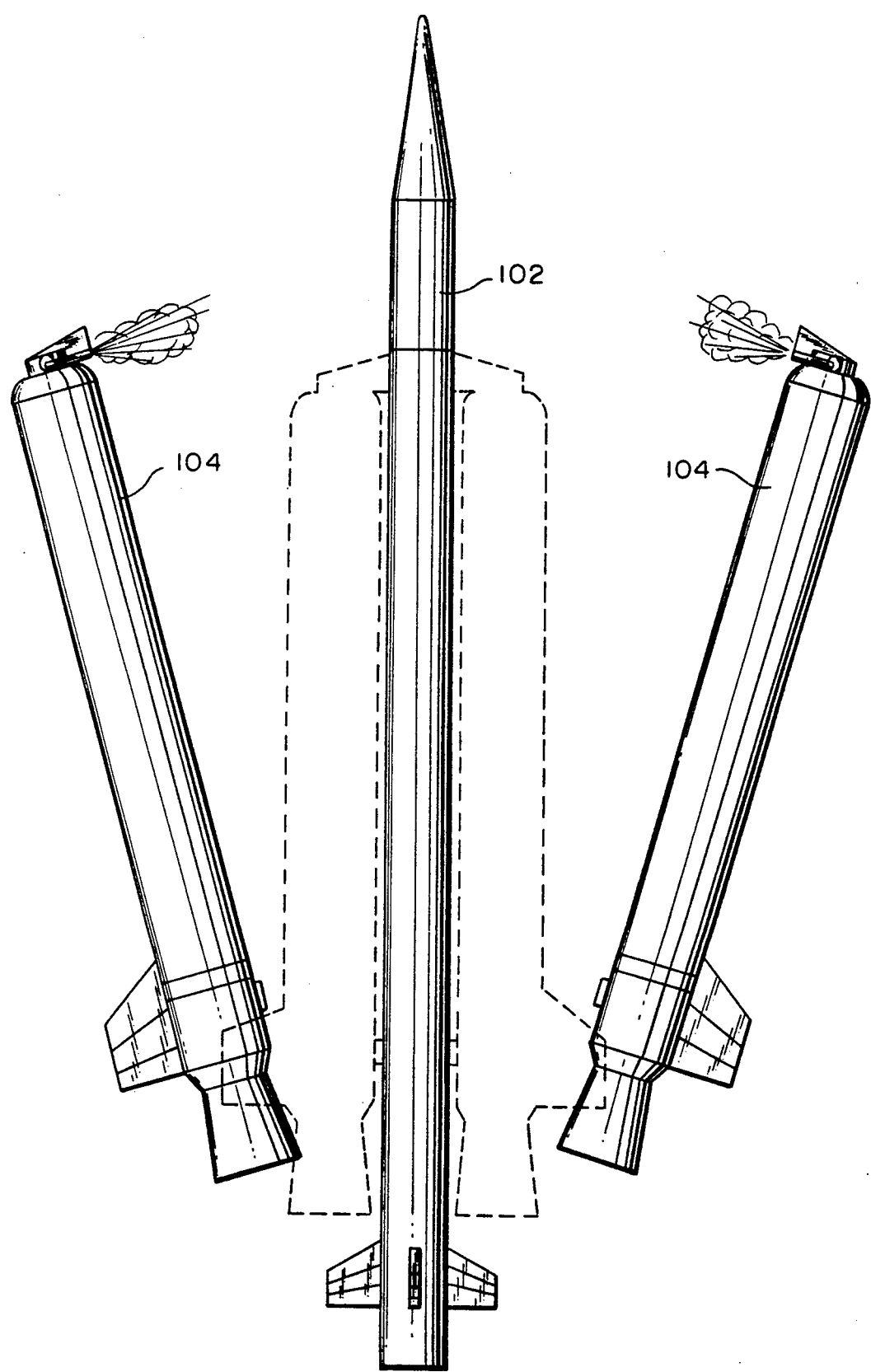
FIG. 5 illustrates the separation of the centerbody from the boosters.

When the manifold legs are thusly severed, the boosters are thrust outwardly from the centerbody causing struts 106 to slide out from niches 310, thereby rendering the boosters into multiple free bodies as shown in FIG. 5. The boosters are assumed to be under some level of thrust when the manifold legs are severed. The two parts of severed legs, which are on each booster, act as nozzles by venting residual propulsive gases in such a way as to move the booster away from the centerbody. The boosters move from the centerbody under influences of booster axial and transverse thrust as well as aerodynamic forces. The centerbody, upon separation from the boosters, consists of a clean slender structure with only steps 304 remaining on it.

A related device is disclosed in a co-pending application titled "Pneumatic Separation Device Ser. No.

07/896,632," by Charles S. Cornelius, David A. Gibson and Stephen C. Cayson. This application was filed simultaneously with applicants' application and is assigned to the U.S. Government as represented by the Department of the Army.

Although a particular embodiment and form of this invention has been illustrated, it is apparent that various modifications and embodiments of the invention may be made by those skilled in the art without departing from the scope and spirit of the foregoing disclosure.

One such modification is affixing to surface of centerbody 102 a protrusion ring that goes all around the circumference of the centerbody, rather than plurality of separate individual steps 304. Another modification is to embed into the surface of centerbody 102 bus rings, rather than separate buses.

Figure 6:
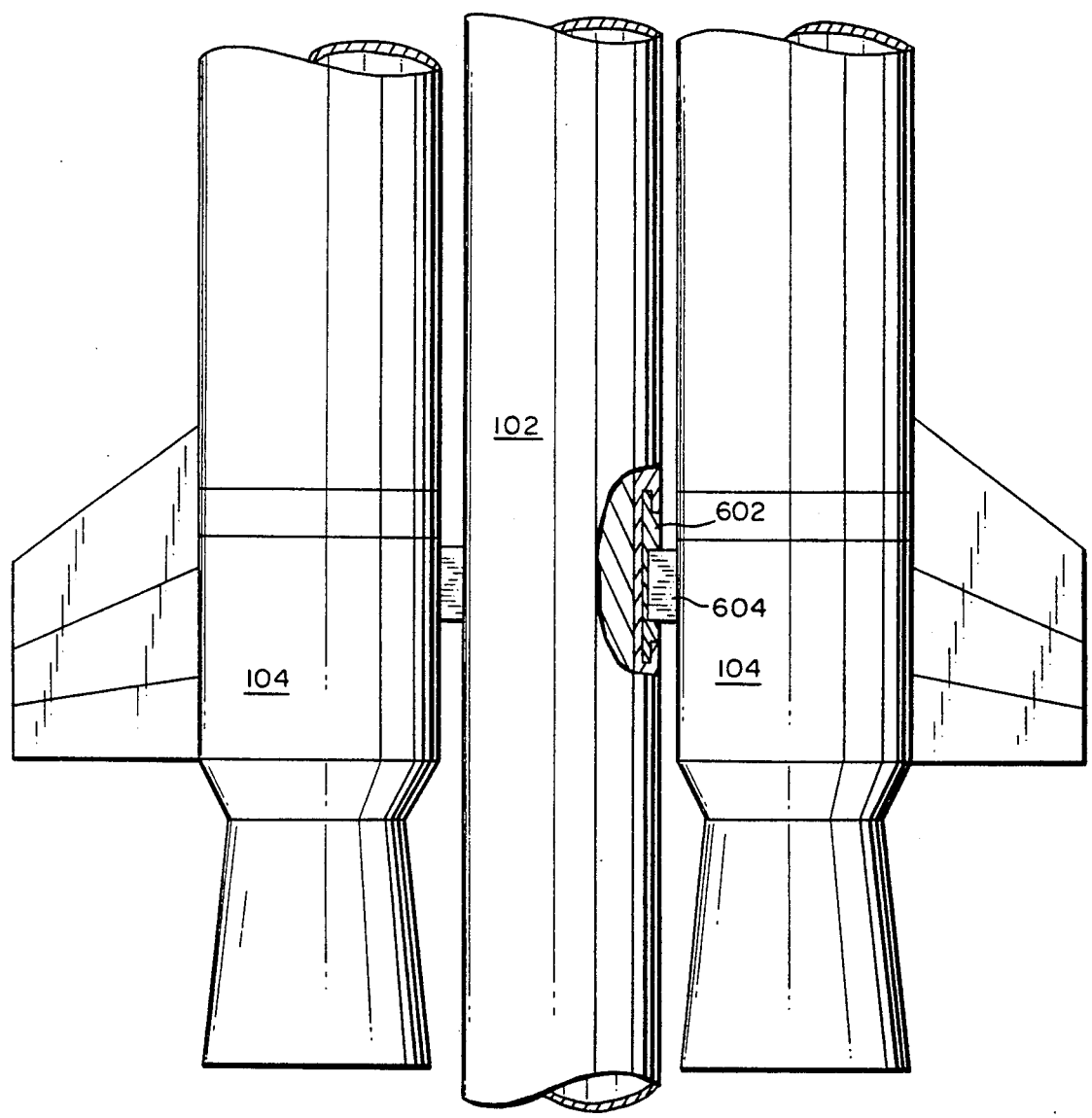
FIG. 6 shows how the aft ends of boosters are held in place prior to the severance of the manifold legs.

Yet a third modification is providing, as shown in FIG. 6, a shallow cavity 602 on the surface of centerbody 102 at the aft end of the centerbody for each protrusion 604 attached to aft end of booster 104 so that protrusion 604 can be inserted into cavity 602, thereby holding in place the aft end of booster 104 until the severance of the manifold legs.

Accordingly, the scope of the invention should be limited only by the claims appended hereto.

We claim:

1. A manifold separation device for separating a booster from a centerbody at a predetermined time, said booster co-operating with a plurality of adjacent boosters to expedite the flight of said centerbody, said device comprising:
   a manifold plumbing assembly, said assembly being coupled between said booster and an adjacent booster to provide a continuous flow path for a suitable medium to flow from said booster to said adjacent booster;
   a timing means;
   a means for severing, said severing means being suitably coupled between said timing means and said plumbing assembly for receiving a signal from said timing means and severing said assembly in response to said signal;
   a niche suitably formed on said centerbody; and
   a force transfer means having a first end and a second end, said transfer means being fixedly attached at said first end to said booster and abutting at said second end into said niche such that upon the severance of said plumbing assembly, said transfer means slides off from said niche to effect the separation of said booster from said centerbody.

2. A separation device as set forth in claim 1, wherein said manifold assembly comprises a hollow manifold legs, said leg being coupled between said booster and said adjacent booster.

3. A separation device as set forth in claim 2, wherein said severing means comprises a plurality of buses, said buses being appropriately affixed to said centerbody and being coupled to said timing means to receive signals therefrom and further transmit the signals; a manifold cutter, said cutter being suitably mounted to cut said manifold leg upon activation; and a contacting means releasably coupled to said buses and being further coupled to said cutter to transmit the signals from said buses to said cutter to activate said cutter.

4. A separation device as set forth in claim 3, wherein said strut has a cavity therethrough and said contacting means is housed in said cavity.

5. A manifold separation device for separating a booster from a centerbody at a predetermined time, said device comprising:
   a hollow manifold leg, said leg flowably connecting said booster with an adjacent booster to permit unobstructed flowage of a medium through said leg and said boosters; a timing means; a means for severing, said severing means being coupled between said timing means and said manifold leg for receiving a signal from said timing means and severing said leg in response to the signal; and a strut, said strut being fixedly attached at one end to said booster and slidably abutting at opposing end said centerbody, said strut further being adapted for sliding off said centerbody upon the severance of said leg to effect the separation of said booster from said centerbody.

* * * * *